UNITED STATES PATENT OFFICE.

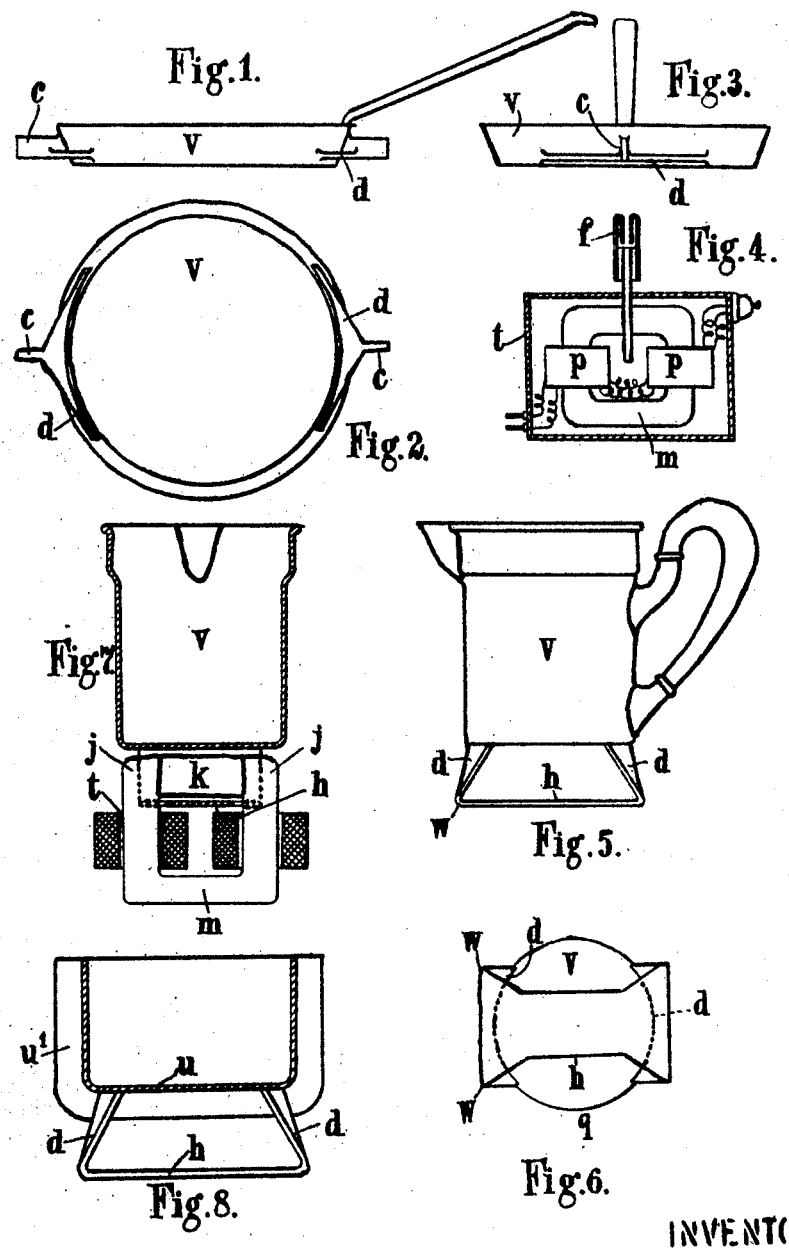

CLARENCE HAROLD LAUTH, OF LONDON, ENGLAND.

ELECTRIC COOKING OR HEATING VESSEL.

1,415,456.      Specification of Letters Patent.      Patented May 9, 1922.

Application filed December 16, 1919. Serial No. 345,352.

*To all whom it may concern:*

Be it known that I, CLARENCE HAROLD LAUTH, a subject of the King of Great Britain and Ireland, and residing at 11 Highbury Mansions, London, N. 1., England, have invented certain new and useful Improvements in and Relating to Electric Cooking or Heating Vessels, of which the following is a specification.

This invention relates to improved electric cooking or heating vessels of the type in which the heating current is of high amperage and low voltage and flows through the shell of the cooking or heating vessel intended to receive the substance to be cooked or heated, the said shell constituting the main resistance of the circuit wherein the heat necessary for heating or cooking purposes is developed, in contradistinction to cooking or heating vessels heated by means of separate electric resistances mounted within the vessel or in the shell thereof, as well as in contradistinction to electric grills, sad irons and electric hot plates.

The invention is more particularly intended to be used in connection with the secondary circuit of a transformer, but I wish it to be understood that the invention is not limited to the use of cooking or heating vessels, hereinafter more particularly referred to, in connection with transformers.

The main objects of the invention are to provide means for improving the distribution of the heat developed in the bottom sides and lid of a cooking vessel, to secure evenly distributed and intense heating in the bottom of the vessel suitable for such operations as boiling and frying, and to secure sufficient heating of the sides of vessels used for stewing and braising, at the same time reducing the heat losses. Another object of the invention is to reduce the occurrence of hot spots in the shell of the cooking vessel.

The invention consists in the provision in the proximity of the bottom edge of a cooking vessel of the type referred to of current distributing contacts attached to, and in electrical contact with, the shell of the vessel, which distributing contacts are dimensioned and shaped in such a manner as to cause an intense sheet of current to flow through and evenly heat the entire bottom of the vessel, while a less intense current flows through the sides thereof, gradually diminishing in intensity towards the top of the vessel.

Generally, the distributing contacts are curved and are of considerable width and fixed to the cooking vessel, two contacts being arranged opposite one another. The distributing contacts are preferably made of copper or other metal which is a good conductor of heat and electricity.

The invention further consists in the improved cooking vessels provided with distributing contacts of the character referred to as hereinafter more particularly described.

Referring to the accompanying drawings which illustrate by way of example various modes of carrying the invention into effect;

Figures 1, 2 and 3 are an elevation, bottom view and side elevation of a frying pan, respectively, provided with distributing contacts according to the present invention.

Figure 4 is a sectional elevation of a transformer in connection with which the frying pan illustrated in Figures 1, 2 and 3, is used.

Figures 5 and 6 are an elevation and a bottom view of a different construction of cooking pot, Figure 7 illustrates a front elevation of the cooking pot placed in position on a transformer, Figure 8 is a sectional elevation of a modified form of construction of the cooking vessel.

Referring to Figures 1-4, $v$ is a frying pan fitted with two massive contacts $c$ which are cast with the pan, or brazed, welded or soldered thereto, said contacts merging into distributing contacts $d$ extending around a portion of the cooking vessel, as shown.

The contacts $c$ are adapted to engage with the spring contacts $f$ constituting the terminals of the secondary coil of a transformer $t$ in order to close the secondary circuit of the transformer through the frying pan $v$. $m$ and $p$ are the magnetic core and the primary windings of the transformer, respectively.

Each of the contacts $c$ with its distributing portion $d$ is attached to the side wall of the pan very near to the bottom edge thereof, being preferably kept clear the bottom of the pan in order to allow of its resting upon its bottom when not in use.

The distributing portion $d$ of the contact is preferably curved, extending for about one-fifth of the circumference of the vessel.

Referring to the form of construction shown in Figures 5-7, the distributing contacts $d$ are fixed to the vessel in the manner hereinbefore referred to, the two opposite contacts being permanently connected together by means of a narrow saddle $h$, this form of construction being more particularly intended for use with the special type of transformer described in my concurrent application, Serial No. 345,353 in which the transformer $t$ is provided with a removable portion $k$ forming part of the magnetic core $m$. The part $k$ is arranged to lift out between the jaws $j$ of the core $m$, thereby permitting the vessel to be taken off or put on the transformer.

In order to make a transformer of the character referred to of high efficiency, it is necessary to keep the distance between the jaws $j$ short, in consequence of which the saddle $h$ has to be made narrow.

Referring more particularly to Figure 6, $d\ d$ indicate the lines of contact of the distributing contact pieces with the bottom of the vessel. The width of the saddle $h$ must always be less than the distance between the distributing contacts. It must also be less than the width of the cooking vessel measured between the two points marked $o$ and $q$, respectively.

As in the arrangement described with reference to Figs. 1—2, the distributing contacts $d\ d$ are secured to the bottom of the vessel $v$ close to the bottom edge, being curved in plan, and each extending for about one-fifth of the circumference of the bottom of the vessel. The distributing contacts are carried down in such a manner as to form a base serving for the rest of the vessel, the width $w\ w$ being for this purpose preferably kept nearly as wide as the vessel.

The contacts and the saddle are preferably made of copper in order to reduce the heat loss due to electric conduction to a minimum, being preferably covered with a bright polished untarnishing non-radiant surface, such as nickel plating, in order to prevent heat losses by radiation or transference of heat to the transformer, the whole of the heat being transferred as far as possible to the cooking vessel by conduction.

It is to be understood that the invention may be applied to any form of vessel, such as saucepans, kettles, jugs, braising pots, etc., all these vessels being preferably made of a hard, durable, stainless, non-magnetic alloy with a bright surface, so as to be capable of being easily cleaned, not to vibrate magnetically, to wear well, and not to waste heat by excessive radiation. A useful metal for this purpose is the alloy known under the name of "Ferry".

Referring to the vessel illustrated in Figure 8, the same is provided with a double wall for heat insulation purposes, the saddle $h$ being connected through the intermediary of distributing contacts $d$ to the inner wall $u$ of the vessel, the space between the said inner wall and the outside wall $u'$ being filled with heat insulating material.

The latter form of construction which may also be used in connection with the form of vessels illustrated in Figures 1–3, is adapted for use with lighting circuits where the current is expensive.

The resistance of the vessel between the distributing contacts $(d)$ is made to exceed .0007 ohms in constructions of the character shown in Figures 1–3, and .0001 ohms in constructions of the character shown in Figures 5–7.

What I claim is:—

1. An electric cooking and heating apparatus for use in a supply circuit of high amperage and low voltage comprising a vessel for receiving the contents to be heated, the shell of the vessel constituting the main resistance of the circuit wherein the heat necessary for heating purposes is developed, and current distributing contacts rigidly secured to the shell of the vessel solely in the proximity of its bottom edge, said contacts being rigidly secured to, and in good thermal and electrical contact with the shell of the vessel and dimensioned and shaped in such a manner as to cause an intense sheet of current to flow through and evenly heat the entire bottom of the vessel and a less intense current to flow through the sides thereof, gradually diminishing in intensity towards the top of the vessel, as set forth.

2. An electric cooking and heating apparatus as claimed in claim 1, in which a saddle of high conductivity interconnects the current distributing contacts and the resistance of the vessel between the distributing contacts exceeds .0001 ohms, as set forth.

In testimony whereof I have signed my name to this specification.

CLARENCE HAROLD LAUTH.